Figure 1:
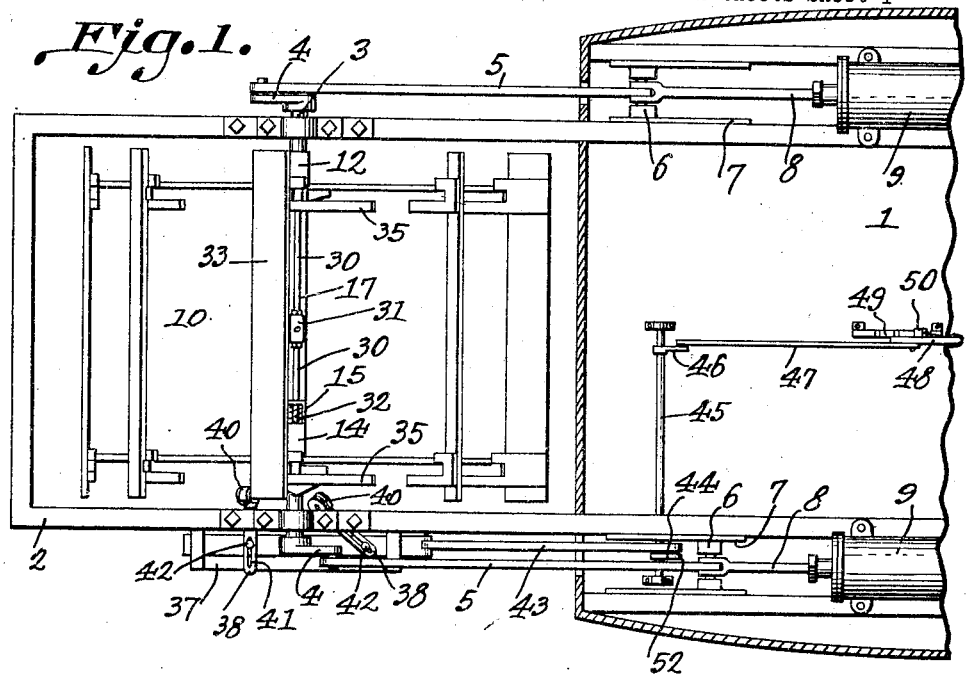

March 16, 1926.

F. ERDMANN 1,576,584

PROPELLER

Filed Sept. 5, 1925    2 Sheets-Sheet 1

Frank Erdmann, Inventor

By C. A. Snow & Co.

Attorneys

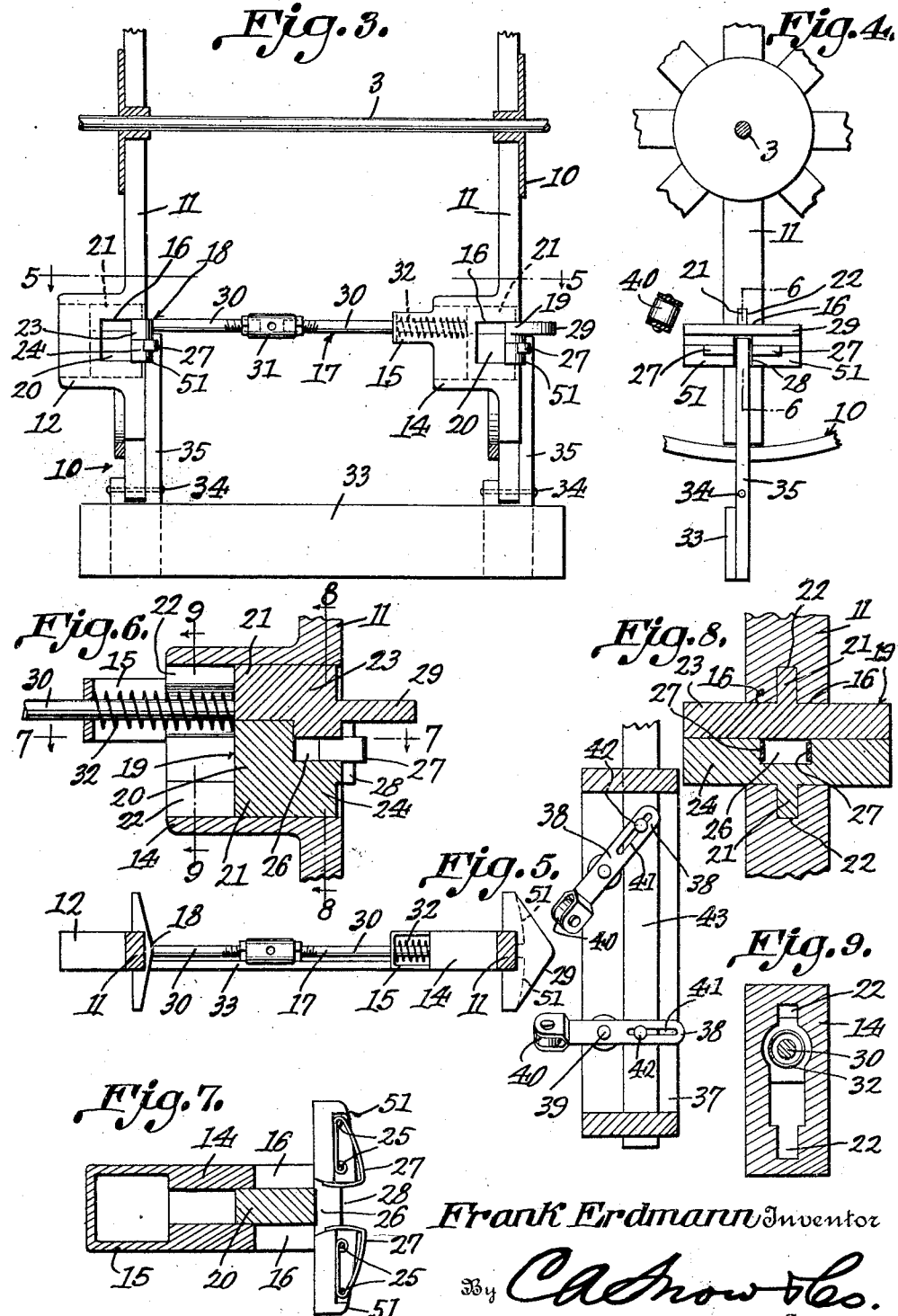

Patented Mar. 16, 1926.

1,576,584

UNITED STATES PATENT OFFICE.

FRANK ERDMANN, OF BUFFALO, NEW YORK.

PROPELLER.

Application filed September 5, 1925. Serial No. 54,789.

*To all whom it may concern:*

Be it known that I, FRANK ERDMANN, a citizen of the United States, residing at Buffalo, in the county of Erie and State of New York, have invented a new and useful Propeller, of which the following is a specification.

This invention aims to provide novel means whereby the blades of a paddle wheel on a vessel may be released after the blades have done their work, the engine of the vessel being relieved of the work of forcing the paddles or blades upwardly through the water, after the blades have done their work so far as propelling is concerned.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 2:
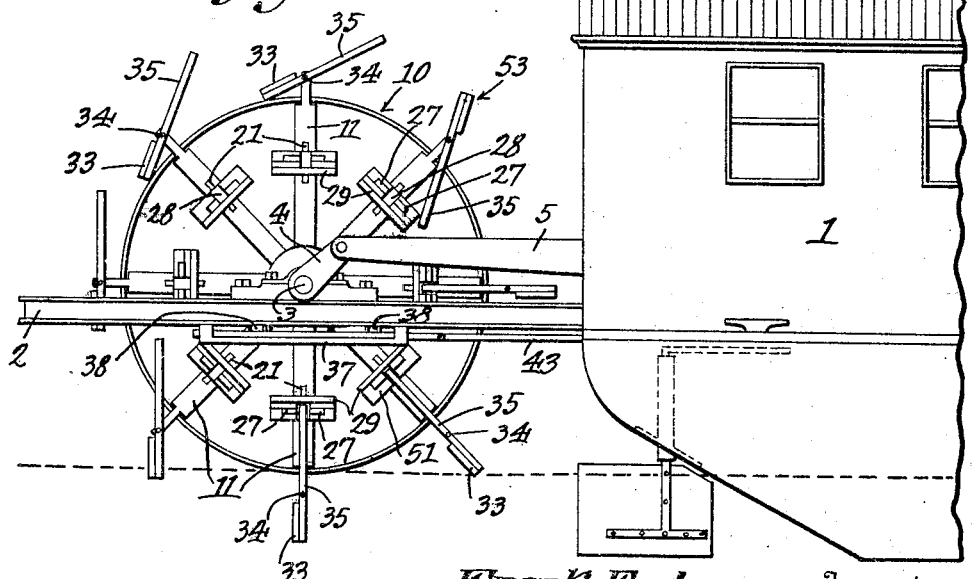

Figure 1 shows in plan, a device constructed in accordance with the invention; Figure 2 is a side elevation; Figure 3 is a section taken vertically through the lower part of a paddle wheel; Figure 4 is a fragmental end elevation showing a portion of the wheel; Figure 5 is a section taken on the line 5—5 of Figure 3; Figure 6 is a section on the line 6—6 of Figure 4; Figure 7 is a section on the line 7—7 of Figure 6; Figure 8 is a section on the line 8—8 of Figure 6; Figure 9 is a section on the line 9—9 of Figure 6.

The device forming the subject matter of this application may be used on boats of widely different sorts, but by way of illustration, there is shown in Figures 1 and 2, the hull 1 of a vessel, the hull carrying a rearwardly projecting frame 2 on which a thwart-ship paddle wheel shaft 3 is supported for rotation, the shaft having cranks 4 pivoted to pitmen 5 connected to cross heads 6 mounted to slide in guides 7 connected to the piston rods 8 of the engine cylinders 9.

The shaft 3 carries a paddle wheel 10 including spokes 11, the spokes at one side of the wheel having lateral guides 12, and the spokes at the other side of the wheel having lateral guides 14, as shown in Figure 3, the guides 14 projecting inwardly, and the guides 12 projecting outwardly. The guide 14 has an inwardly prolonged loop-shaped extension 15. There are recesses or notches 16 in the inner edges of the guides 12, in the outer edges of the guides 14, and in the corresponding spokes 11.

Locking slides are mounted for horizontal reciprocation on the paddle wheel 10, transversely thereof. The locking slide 17 is a composite structure, each locking slide including a cross member 18 slidable in the recess 16 of the guide 12, and a cross member 19 slidable in the recess 16 of the guide 14. The cross members 18 and 19 have reduced portions 20 slidable in the guides 12 and 14, as shown in Figure 7, the cross members being provided with ribs 21 which slide in grooves 22, formed in the guides 12 and 14. Each of the cross members or heads 18 and 19 comprises cooperating parts 23 and 24 held together by securing elements 25 retaining outstanding spring latches 27 located on opposite sides of seats 28 formed in the parts 24 and 23, the parts 24 having superficial recesses 26 for the reception of the latches 27. The constituent members of the transverse heads 18 and 19 are provided with oppositely slanting cam edges 51. The cross member 19 at one side of the wheel has an outstanding, oppositely slanting cam 29, but there is no such cam on the member 18. The cross members or heads 18 and 19 are united by a longitudinally adjustable connection, made up of rods 30 connected at their inner ends by a turn buckle 31, and mounted at their outer ends in the parts 23 of the members 18 and 19, as indicated in Figure 6. A compression spring 32 surrounds one of the rods 30 of each connection and abuts at one end against the part 23 of the cross member 19, the other end of the spring abutting against the extension 15 of the guide 14. The function of the springs 32 is to carry the locking slides to the right in Figure 3.

The blades of the paddle wheel 10 are marked by the numeral 33 and include arms 35 pivotally mounted intermediate their ends at 34 on the spokes 11 of the paddle wheel 10. The inner ends of the arms 35 on the blades 33 are adapted to be received in the seats 28 that are fashioned in the cross members or heads 18 and 19 of the spring advanced locking slide 17.

A bracket 37 is mounted on one side of the frame 2, and actuating levers 38 are fulcrumed at 39 on the bracket 37 for horizontal swinging movement, rollers 40 being journaled on the inner ends of the levers, and the rollers being adapted to cooperate, one at a time, with the operating cam 29 on the locking slide 17, as the levers 38 are selectively operated. The levers 38 have slots 41 receiving projections 42 on a rod or connection 43 mounted for right line reciprocation in the bracket 37, and united by a suitable connection 52 with a crank 44 on a shaft 45 mounted to rock on the hull 1 and having an arm 46 pivoted to a connection 47 which is pivoted to a lever 48 fulcrumed on a segment 49 and provided with a latch 50 adapted to cooperate with the segment, the lever 48 preferably being the lever whereby the engine (of which the cylinders 9 form part) is reversed.

Whilst any paddle wheel blade 33 is doing its work in propelling the vessel, the arms 35 of the blade are engaged in the seats 28 of the locking slide 17, and the blades are held against swinging movement on their pivotal mountings 34, the slide 17 being carried to the right in Figures 3 and 6 by the spring 32. By means of the lever 48, the connection 47, the crank 46, the shaft 45, the crank 44, the connection 52, and the rod 43, together with the projections 42, the levers 38 may be swung on their fulcra 39, to bring one or the other of the rollers 40 into operative relation to the cam 29 on the locking slide 17, one of the levers 38 being in working position when the paddle wheel 10 is in direct rotation, and the other of the levers being in working position when the paddle wheel is in reverse rotation. About the time that the blade 33 has done its work, so far as propelling the vessel is concerned, the cam 29 engages the roller 40 on that lever 38 which is in working position, and the locking slide 17 is moved to the left in Figures 3 and 6, the spring 32 being compressed, and the seat 28 being disengaged from the arm 35 on the blade. The blade thus is released and no longer affords any pressure against the water, the blade swinging into the position shown at the lower left hand corner of Figure 2. As soon as the cam 29 rides off the roller 40 of the lever 38 which is in working position, the locking slide 17 moves to the right in Figures 3 and 6, under the impulse of the spring 32 and disposes the cam edge 51 in such a position that when the blade swings from the position marked by the numeral 53 in Figure 2, the arms 35 of the blade will engage in the seats 28, the spring 32 yielding to permit this operation. In case the spring 32 does not respond quickly enough, and carry the locking slide 17 to the right in Figures 3 and 4, one of the latches 27 will come into play, and prevent the arms 35 of the blade from swinging past center, and across the seats 28. It is therefore assured that the arms of the blades 33 will always engage in the seats 28. Since the lever 48 is the reversing lever for the engine, the engineer is assured that the levers 38 will work in synchronism with the reversing of the engine.

I claim:

1. In a device of the class described, a paddle wheel supported for rotation, a blade pivotally mounted on the paddle wheel, a spring actuated locking device movably mounted on the paddle wheel and engaging the blade to hold the blade in working position, the locking device embodying cam parts, means under the control of an operator for operating the locking device to free the blade, said means coacting with one of the cam parts of the locking device, and the blade cooperating with the other of the cam parts, to move the locking device, and to permit the blade to engage with the locking device, as the blade swings to working position.

2. In a device of the class described, a paddle wheel supported for rotation, a blade pivotally mounted on the paddle wheel; a locking device comprising heads having seats engaging the blade at the sides of the wheel, to hold the blade in working position, and a longitudinally adjustable connection between the heads; spring means for moving the locking device to engage with the blade, and means under the control of an operator for engagement with the locking device, to move it to unlocked position with respect to the blade when the blade is at a point in the orbit which it describes.

3. A device of the class described, constructed as set forth in claim 1, and further characterized by the fact that said means under the control of an operator embodies levers and fulcra therefor, the levers being so positioned that they cooperate, at one end, with said one of the cam parts of the locking device, a member mounted for rightline sliding movement, and means for connecting the levers with said sliding member.

In testimony that I claim the foregoing as my own, I have hereto affixed my signature.

FRANK ERDMANN.